Patented May 10, 1938

2,116,635

UNITED STATES PATENT OFFICE

2,116,635

MIXED POLYVINYL RESINS AND METHOD OF MAKING SAME

Howard W. Matheson, Montreal, Quebec, and George O. Morrison, Shawinigan Falls, Quebec, Canada, assignors to Shawinigan Chemicals Limited, Montreal, Quebec, Canada, a corporation of Canada No Drawing. Application December 1, 1933, Serial No. 700,608

5 Claims. (Cl. 260—2)

This invention relates to new vinyl resins of a mixed type and to a process of making such resins.

In Patent 2,036,092 granted March 31, 1936, there is disclosed a process of making vinyl resins by hydrolyzing polyvinyl esters and reacting or condensing the product with an aldehyde.

According to this invention, new resins of mixed types are produced by partially or completely hydrolyzing polyvinyl esters of monocarboxylic acids and reacting or condensing the hydrolyzed polymers with two or more different aldehydes or bodies which release aldehyde radicals in the reaction without accompanying undesirable effects. The aldehydes may be aliphatic or aromatic or both may be used, and the condensing reaction may be carried out using the aldehydes simultaneously or successively. Also, the hydrolysis and the condensing with aldehyde may be carried out sequentially or simultaneously.

The resins which can be produced according to this invention are different from and are superior in many respects to related simple resins produced according to the aforesaid patent, and are also different from and superior in many respects to mixtures of related simple resins. Thus, a mixed resin produced by condensing a completely or partially hydrolyzed polyvinyl acetate with formaldehyde and acetaldehyde is quite different from the related simple resins made by condensing a similar hydrolyzed polyvinyl acetate with either of the aldehydes alone and is different from a mixture of the related simple resins having the same composition as the mixed resin. These mixed resins have different resistance to shock, different softening point, different solubility and different degrees of hardness and toughness from either of the related simple resins or the mixture thereof. It is believed the molecule of the mixed resin produced as herein described is different from the molecules of the related simple resins in that it contains aldehyde groups of different sorts. The mixed resins made in this way from polyvinyl acetate may be used as a base in moulding compositions, for the production of films, and in general for the purposes for which resins are used.

The following examples are illustrative of the invention which, however, is not limited to the materials, times, temperatures, proportions and/or means disclosed in the examples. To facilitate comprehension and comparison, the characteristics of the polyvinyl ester, the solvent, the acid and the final recovery are the same in all examples, so that the differences between the examples lie mainly in the aldehydes, in the proportions thereof, and in the manner of their use, and to a lesser extent in the hydrolysis.

Example I 100 parts of a polyvinyl acetate, the molar solution of which in benzene has a viscosity of 15 centipoises is dissolved in 150 parts of a solvent comprising 65% butyl acetate and 35% butyl alcohol. To this solution is added 11.7 parts of 35% sulphuric acid, 11 parts of paraformaldehyde and 16.1 parts of acetaldehyde. The mixture is maintained at a temperature of 70° C. for 9½ hours, after which the acid is neutralized with sodium hydroxide, the solvent recovered by steam distillation and the resin washed and dried. The hydrolysis is 71.25%. The resin is soluble in most commercial solvents and has a softening point of 169.2.

Example II

The procedure of Example I is followed excepting that the aldehydes used are 16.1 parts acetaldehyde and 32.6 parts benzaldehyde. The hydrolysis is 71%. The resin is less soluble than in the previous example and has a higher softening point.

In the foregoing examples, the condensation is with two aldehydes simultaneously and the two aldehydes are present in equimolecular proportions. The characteristics of the mixed resins produced are about midway between the characteristics of the related simple resins. By varying the molecular proportions of the aldehydes, the characteristics of mixed resins will tend toward the characteristics of a simple resin made using whichever of the aldehydes predominates. The proportions of the aldehydes may be varied infinitely but it will be understood when only a small relative proportion of one aldehyde is used the characteristics of it may not be readily perceptible in face of characteristics imparted by the other aldehyde or aldehydes.

Example III

A solution as in Example I containing the same amount and strength of acid is reacted at 70° C. for 3½ hours with 12.6 parts acetaldehyde. Then 13.2 parts paraformaldehyde is added and the reaction continued for 6¼ hours. The resin is recovered as in Example I. The hydrolysis is 70.7%. The solubility and softening point are about the same as the resin of Example I.

Example IV

A solution as in Example I has 23.5 parts of 35% sulphuric acid and 8.8 parts of formaldehyde added and is heated to 70° C. for 2 hours. Then 19.8 parts of acetaldehyde is added and the temperature maintained for 4½ hours. The resin is recovered as in Example I. The hydrolysis is 66%. The solubility and softening point are about the same as in Example III but the water absorption is lower.

Example V

The solution, acid and formaldehyde as in Example IV are heated at 70° C. for 3 hours and then 34 parts of benzaldehyde is added and the temperature maintained for 6½ hours. The resin is recovered as in previous examples. The hydrolysis is 80%. The resin is substantially insoluble in most commercial solvents and has higher softening point than the resin of Examples I, III and IV.

In Examples III, IV, and V, two aldehydes are used successively and the amounts of the aldehydes and the times of treatment with each are such that about half the percentage hydrolysis occurs in presence of one aldehyde and the remaining half in presence of the other aldehyde. In Example IV, the time of treatment is shorter than in previous examples to give approximately the same percentage hydrolysis because of the greater amount of acid used. In Example V the same total time as Examples I, II and III gives a higher percentage hydrolysis because of the greater amount of acid. By varying the relative proportions of the aldehydes, the time of treatment with each or the order in which the aldehydes are used, the characteristics of the resin may be varied, with results similar to those explained in connection with Examples I and II. The lower aldehydes of the series are more active and have more pronounced effect than the higher members and the aromatic aldehydes tend to produce tougher resins than the aliphatic aldehydes do.

The foregoing examples each disclose use of only two aldehydes, but it will be understood three or more different aldehydes may be employed either successively or all together or in any combination or order desirable. For instance, two aliphatic aldehydes may be used together in the first stage and an aromatic aldehyde in the second stage, either alone or with another aromatic aldehyde or with an aliphatic aldehyde, which may be the same as or different from either of those used in the first stage. Alternatively, the aromatic aldehyde or aldehydes may be used in the first stage alone or with one or more aliphatic aldehydes. Moreover, the invention is not limited to the amount of any one aldehyde or to the total amount of aldehydes used. The examples disclose total amounts of aldehyde varying between approximately 25% and 50% of the polymer but the amount may be materially less or materially more according to the polymer, the percentage hydrolysis, the aldehydes and the characteristics desired in the final product. In general, there is a calculable theoretical amount of any aldehyde which corresponds to any given percentage hydrolysis. For instance, 6 lbs. polyvinyl acetate as used in the examples hydrolyzed 70% will require 332 gms. formaldehyde or 487 gms. acetaldehyde. If the hydrolysis is 35%, the theoretical amount of aldehyde is half of the above. An excess of aldehyde is required and the amount of excess is in the neighbourhood of 80% for aliphatic aldehydes and 50% for aromatic aldehydes. When the aldehydes are used sequentially, the order in which they are used is a factor in determining the characteristics of the resin. The aldehyde first used tends to have greater influence than the subsequently used aldehyde, but this is in turn subject to the characteristics of the aldehyde. Thus, starting with a given polyvinyl ester and carrying hydrolysis to the same extent in all cases and using equimolecular proportions of two aldehydes, one may get three different results by:—

(a) Treating with acetaldehyde and formaldehyde simultaneously, (b) Treating with acetaldehyde and subsequently with formaldehyde, (c) Treating with formaldehyde and subsequently with acetaldehyde.

By varying the relative proportions of the aldehydes in (b) and (c) according to their known effects, and varying the relative times of treatment, one may adjust the conditions of one or other of the two methods to produce desired characteristics in the product.

In addition to the foregoing, the viscosity of the polyvinyl ester and the percentage hydrolysis influence the characteristics of the final resin. In general, the lower the viscosity of the polyvinyl ester is, the lower will be the viscosity, softening point and impact resistance of the final resin. But this is in a measure subject to the percentage hydrolysis. By using a polyvinyl ester of lower viscosity and increasing the percentage hydrolysis, or vice versa, one may produce resins in which one or more characteristics are substantially constant. In general, increasing the percentage hydrolysis raises the warp point, softening point, viscosity and durability of the resin and increases its water resistance.

From the foregoing, it will be understood that using always the same polyvinyl ester, one may get a wide range of variation in one or more of the characteristics of the produced resins and may predetermine one or more of the characteristics of the resin by appropriate selection of the aldehydes used and by varying the relative proportions thereof and/or the order of their use. Alternatively, similar variations and predeterminations may be effected, in some measure at least, by change in the characteristics of the polyvinyl ester and in the percentage hydrolysis.

While the only polyvinyl ester mentioned in the examples is polyvinyl acetate of 15 centipoises viscosity, it is to be understood the invention is not limited to this particular ester polymer nor to polymers of this viscosity, but extends to treatment of other polyvinyl esters of fatty acids, for example, polyvinyl butyrate and polyvinyl propionate, and to polyvinyl esters having viscosities between less than 1 centipoise and more than 100 centipoises.

In hydrolyzing the polymers, any other mineral acid may be used instead of sulphuric acid and the amount and concentration of the acid may be varied within wide limits as the hydrolysis proceeds with practically any amount and concentration of acid, although with low concentration of acid the rate of hydrolysis is undesirably slow, while with a very high concentration undesirable products may be formed.

Any other suitable solvent for the polymer may be used instead of the mixture given in the examples, for instance, ethyl alcohol, acetone, ethyl acetate, or amyl acetate or mixtures of these.

The temperature and duration of the reaction may be varied within wide limits, according to the polymer, the desired percentage hydrolysis, the aldehydes and the characteristics desired in the final resin. Increase in temperature or increase in the amount of acid increases the rate of hydrolysis and the rate of condensation with aldehyde. Practically the only limits of temperature are those dictated by efficiency and safety. The reactions will proceed, though slowly, at 20° C., while at 100° C., pressure must be used and the reactions are difficult to control. The upper limit is that at which undesirable side reactions or decomposition of the reagents occurs and this of course depends upon the esters and aldehydes which are being used.

Different aldehydes produce different characteristics in the final resin and by condensing the hydrolyzed polymer with a plurality of aldehydes, the characteristics effluent from each may be obtained in the resin much more easily and cheaply than by blending different resins and the mixed resin is superior to a mixture of resins of the same composition. By varying the relative amounts of the different aldehydes used, the extent to which the characteristics imparted by each are evident in the resin may be varied.

So far as can be ascertained, the hydrolyzed polymers may be condensed with any aldehyde, either aliphatic or aromatic, so that the invention is not confined to use of the aldehydes hereinbefore named.

Having thus described our invention, what we claim is:—

1. A process of making mixed resins which comprises reacting together a polyvinyl ester, water and an aldehyde with hydrolysis of the ester and condensation of the hydrolysis product with the aldehyde and subsequently reacting on the product of said reaction with a different aldehyde with further hydrolysis and with condensation of the hydrolysis product with the second aldehyde, the reactions being carried out in presence of an acid reacting substance as catalyst and until the total hydrolysis is at least 66%.

2. A process according to claim 1, in which the polyvinyl ester is a polyvinyl acetate.

3. A process according to claim 1 in which the aldehydes include acetaldehyde and formaldehyde.

4. A process according to claim 1 in which the aldehydes include an aliphatic aldehyde and an aromatic aldehyde.

5. A process of making mixed polyvinyl resins which comprises condensing an hydrolysis product of a polyvinyl ester with an amount of an aldehyde less than will combine with the hydrolysis product and when said aldehyde is substantially all combined with the hydrolysis product condensing the mass with a different aldehyde in amount in excess of that which can combine with the unreacted hydrolysis product present during said second condensation.

HOWARD W. MATHESON.
GEORGE O. MORRISON.

DISCLAIMER 2,116,635.—*Howard W. Matheson*, Montreal, Quebec, Canada, and *George O. Morrison*, Shawinigan Falls, Quebec, Canada. MIXED POLYVINYL RESINS AND METHOD OF MAKING SAME. Patent dated May 10, 1938. Disclaimer filed July 30, 1940, by the assignee, *Shawinigan Chemicals Limited*.

Hereby enters this disclaimer to claim 5 of said specification.

[*Official Gazette August 27, 1940.*]

amples, for instance, ethyl alcohol, acetone, ethyl acetate, or amyl acetate or mixtures of these.

The temperature and duration of the reaction may be varied within wide limits, according to the polymer, the desired percentage hydrolysis, the aldehydes and the characteristics desired in the final resin. Increase in temperature or increase in the amount of acid increases the rate of hydrolysis and the rate of condensation with aldehyde. Practically the only limits of temperature are those dictated by efficiency and safety. The reactions will proceed, though slowly, at 20° C., while at 100° C., pressure must be used and the reactions are difficult to control. The upper limit is that at which undesirable side reactions or decomposition of the reagents occurs and this of course depends upon the esters and aldehydes which are being used.

Different aldehydes produce different characteristics in the final resin and by condensing the hydrolyzed polymer with a plurality of aldehydes, the characteristics effluent from each may be obtained in the resin much more easily and cheaply than by blending different resins and the mixed resin is superior to a mixture of resins of the same composition. By varying the relative amounts of the different aldehydes used, the extent to which the characteristics imparted by each are evident in the resin may be varied.

So far as can be ascertained, the hydrolyzed polymers may be condensed with any aldehyde, either aliphatic or aromatic, so that the invention is not confined to use of the aldehydes hereinbefore named.

Having thus described our invention, what we claim is:—

1. A process of making mixed resins which comprises reacting together a polyvinyl ester, water and an aldehyde with hydrolysis of the ester and condensation of the hydrolysis product with the aldehyde and subsequently reacting on the product of said reaction with a different aldehyde with further hydrolysis and with condensation of the hydrolysis product with the second aldehyde, the reactions being carried out in presence of an acid reacting substance as catalyst and until the total hydrolysis is at least 66%.

2. A process according to claim 1, in which the polyvinyl ester is a polyvinyl acetate.

3. A process according to claim 1 in which the aldehydes include acetaldehyde and formaldehyde.

4. A process according to claim 1 in which the aldehydes include an aliphatic aldehyde and an aromatic aldehyde.

5. A process of making mixed polyvinyl resins which comprises condensing an hydrolysis product of a polyvinyl ester with an amount of an aldehyde less than will combine with the hydrolysis product and when said aldehyde is substantially all combined with the hydrolysis product condensing the mass with a different aldehyde in amount in excess of that which can combine with the unreacted hydrolysis product present during said second condensation.

HOWARD W. MATHESON.
GEORGE O. MORRISON.

DISCLAIMER 2,116,635.—*Howard W. Matheson*, Montreal, Quebec, Canada, and *George O. Morrison*, Shawinigan Falls, Quebec, Canada. MIXED POLYVINYL RESINS AND METHOD OF MAKING SAME. Patent dated May 10, 1938. Disclaimer filed July 30, 1940, by the assignee, *Shawinigan Chemicals Limited.*

Hereby enters this disclaimer to claim 5 of said specification.

[*Official Gazette August 27, 1940.*]

DISCLAIMER 2,116,635.—*Howard W. Matheson*, Montreal, Quebec, Canada, and *George O. Morrison*, Shawinigan Falls, Quebec, Canada. MIXED POLYVINYL RESINS AND METHOD OF MAKING SAME. Patent dated May 10, 1938. Disclaimer filed July 30, 1940, by the assignee, *Shawinigan Chemicals Limited*.

Hereby enters this disclaimer to claim 5 of said specification.

[*Official Gazette August 27, 1940.*]